United States Patent
Wu

(10) Patent No.: US 8,260,339 B2
(45) Date of Patent: Sep. 4, 2012

(54) METHOD FOR MATCHING GROUP PAGING OF A CDMA TRUNKING SYSTEM

(75) Inventor: Chuanxi Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 145 days.

(21) Appl. No.: 12/747,721

(22) PCT Filed: Dec. 12, 2008

(86) PCT No.: PCT/CN2008/073495
§ 371 (c)(1),
(2), (4) Date: Jun. 11, 2010

(87) PCT Pub. No.: WO2009/082914
PCT Pub. Date: Jul. 9, 2009

(65) Prior Publication Data
US 2010/0267400 A1    Oct. 21, 2010

(30) Foreign Application Priority Data

Dec. 17, 2007    (CN) .......................... 2007 1 0198491

(51) Int. Cl.
*H04B 7/00* (2006.01)
(52) U.S. Cl. ................. 455/518; 455/519; 455/458
(58) Field of Classification Search .................. 455/518, 455/519, 458
See application file for complete search history.

(56) References Cited

U.S. PATENT DOCUMENTS

| | | | |
|---|---|---|---|
| 2004/0131075 A1* | 7/2004 | Sinnarajah et al. | 370/431 |
| 2005/0078627 A1* | 4/2005 | Yoon et al. | 370/328 |
| 2007/0082690 A1* | 4/2007 | Fabien et al. | 455/518 |
| 2009/0080353 A1* | 3/2009 | Zhang et al. | 370/312 |

* cited by examiner

*Primary Examiner* — Barry W Taylor
(74) *Attorney, Agent, or Firm* — Clark & Elbing LLP

(57) ABSTRACT

A method for matching group paging of a CDMA system, the method comprises: a mobile station determines during a paging process the paging type received and executes a corresponding group paging matching operation according to the result determined.

7 Claims, 4 Drawing Sheets

METHOD FOR MATCHING GROUP PAGING OF A CDMA TRUNKING SYSTEM

CROSS-REFERENCE TO RELATED APPLICATIONS

This application is the U.S. national stage of International Application No. PCT/CN2008/073495, filed Dec. 12, 2008, which claims benefit of Chinese Patent Application No. CN 200710198491.5, filed Dec. 17, 2007.

FIELD OF THE INVENTION

The present invention relates to the technology for identifying different groups in a Code Division Multiple Access (CDMA) trunking, in particular to a method for matching group paging of a CDMA trunking system.

BACKGROUND OF THE INVENTION

The trunking communication system originated in the late 70s and the early 80s of $20^{th}$ Century. The earliest trunking communication is an analog system, while the digital trunking technology appeared worldwide in the 90s of $20^{th}$ Century. In the late 90s of $20^{th}$ Century, the digital trunking technology appeared in China. One service of the trunking communication can include a plurality of users being allocated into different groups, each of which is called a trunking group. One of the most primary features of the trunking communication is trunking call or group call. The group call function of the trunking service is to call a group number at one communication terminal or a dispatching station, so that all the terminals in the group can be simultaneously called into one call so as to realize an effect that a plurality of users communicate at the same time.

The trunking communication system generally uses a group call identifier to identify one trunking group, and the group call identifier uniquely identify one trunking group, and generally may be consisted of a group identifier (GID or Gid) solely or together with other attributes such as the group call area, wherein the GID identifies the terminal in the trunking group, and each terminal of the trunking group has the group ID defined by the trunking group, and the trunking group stores the group ID in a data store device on the system side and in the terminal, which is used to determine the trunking group to which the terminal belongs when authentication is performed. One terminal may sign up with a plurality of trunking groups at the same time. The group call area is an area that the trunking group may call defined when the group call of the trunking group is a voice group call service. Only the terminal which is located in this area and is a member of the trunking group can perform a call service. Since the GID is used to identify the trunking group to which the terminal belongs, each different trunking group has a different GID, but the resource of the GID is limited, for example, a 3-digit GID number can identify 1000 different trunking groups, while a 4-digit GID number can identify 10000 different trunking groups. However, as the scale-up of the trunking network, such an encoding mode of the GID is far from enough in view of the trunking communication system in the whole communication network, which will result in that a group paging operation cannot be performed effectively. Further, it will result in inconvenience in management if this encoding mode of the GID is used and the number of digits for encoding the GID is increased to follow the development of the trunking communication system.

SUMMARY OF THE INVENTION

Considering the problem existed in the related art that the encoding mode of the GID will result in that a group paging operation cannot be performed effectively and the problem of the inconvenience in management, the present invention is provided. To this end, the main object of the present invention is to provide an improved scheme for matching group paging of a CDMA trunking system to solve at least one of above problems in the related art.

According to one aspect of the present invention, a method for matching group paging of a CDMA trunking system is provided.

The method for matching group paging of a CDMA trunking system according to the present invention comprises:

when a mobile station receives, on a paging channel, a mobile station addressing paging message which contains an international mobile subscriber identity or a temporary mobile subscriber identity assigned to the mobile station, the mobile station performs a mobile station paging matching operation, and sends a paging response message on an access channel;

when the mobile station receives, on the paging channel, a general paging message which contains a group identifier addressing assigned to the mobile station, a group identifier paging matching operation of the mobile station is performed, and the mobile station sends a paging response message of a big group on the access channel;

when the mobile station receives a broadcast paging and channel allocation message, the group identifier paging matching operation of the mobile station is performed, in addition, if the broadcast paging and channel allocation message contains the group identifier assigned to the mobile station and is a broadcast paging and channel allocation message without any resource, the mobile station sends a group identifier paging response message to a base station; if the broadcast paging and channel allocation message contains the group identifier assigned to the mobile station and is a broadcast paging and channel allocation message with resource, the mobile station enters into a service state; if the broadcast address contained in the broadcast paging and channel allocation message does not match to any of the group identifiers stored in the mobile station, the mobile station discards the broadcast paging and channel allocation message.

Preferably, when the mobile station receives the mobile station addressing paging message which contains the international mobile subscriber identity or the temporary mobile subscriber identity assigned to the mobile station, if the mobile station receives, on a forward common control channel, the mobile station addressing paging message containing the international mobile subscriber identity or the temporary mobile subscriber identity assigned to the mobile station, the mobile station sends the paging response message on a reverse common signaling channel; if the mobile station is configured to receive a broadcast message and receives a general paging message which contains a burst type and a receiving broadcast address on the paging channel that the mobile station is configured to, the mobile station performs a broadcast paging process; and if the mobile station is configured to receive the broadcast message and receives a general paging message which contains the burst type and the receiving broadcast address on the forward common control channel that the mobile station is configured to, the mobile station performs an enhanced broadcast paging process.

Preferably, the method for matching group paging according to the present invention further comprises: if the base station receives a group identifier paging response message, the base station sending an extended channel allocation message or a push to talk (PTT) broadcast paging and channel indication allocation message.

Preferably, if the base station sends the extended channel allocation message, the group identifier paging response message received by the base station is a paging response of a big group, and the base station initiates a procedure of service channel process to the mobile station.

Preferably, if the base station sends the PTT broadcast paging and channel allocation message to the mobile station, the group identifier paging response message received by the base station is the response to the broadcast paging and channel allocation message without any resource, the base station sends a broadcast paging and channel allocation message with resource to the mobile station, and instructs the mobile station to establish a CDMA service channel.

Preferably, the method for matching group paging according to the present invention may further comprises: determining a time slot period of PTT broadcast group identifier paging, wherein when the mobile station calls a terminal, the time slot period being configured to monitor the paging channel; when the mobile station monitors the time slot of group identifier paging, the time slot period being configured to receive the broadcast paging and channel allocation message.

Preferably, the time slot period is a paging channel time slot period having a time length equal to $(2^{i-4} \times 16+3)$ time slots, wherein $0 \leq i \leq 7$, i is the parameter message received from a PTT system.

Through the above technology scheme, a mobile station performs the corresponding group paging matching operation according to the different messages received, which can solve the problem in the related art that the encoding mode of the GID results in that a group paging operation can not be performed effectively, thus the group paging process can be performed with high efficiency.

Other features and advantages of the present invention will be described in the following specification, and partly apparent therefrom, or understood by implementing the present invention. The objects and other advantages of the present invention will be realized and obtained through the structures specially defined in the specification, claims and drawings.

BRIEF DESCRIPTION OF THE DRAWINGS

The drawings provide a further understanding of the present invention and form a part of the specification. The drawings are used to explain the present invention together with the embodiments of the present invention without unduly limiting the scope of the present invention, wherein.

DETAILED DESCRIPTION OF THE EMBODIMENTS

Function Overview

Considering the problem existed in the related art that the encoding mode of the GID results in that a group paging operation cannot be performed, the embodiments of the present invention provide an improved scheme for matching group paging of a CDMA trunking system. In the scheme provided by the embodiments of the present invention, the mobile station first determines the type of the received paging, and then performs a corresponding group paging matching operation according to the determined result so as to perform group paging with high efficiency.

In the following embodiments, if there is not a specific announcement, the related trunking group identifier (GID or Gid) may also be called as trunking group indicator, or group identifier, group indicator, or group identifier code, etc.

The preferred embodiments of the present invention will be described hereinafter in conjunction with the drawings thereof, it is to be understood that the preferred embodiments described here is used to illustrate and explain the present invention without unduly limiting the present invention. The embodiments of the present invention and the features of the embodiments can combine with each other if there is no conflict.

Figure 1:
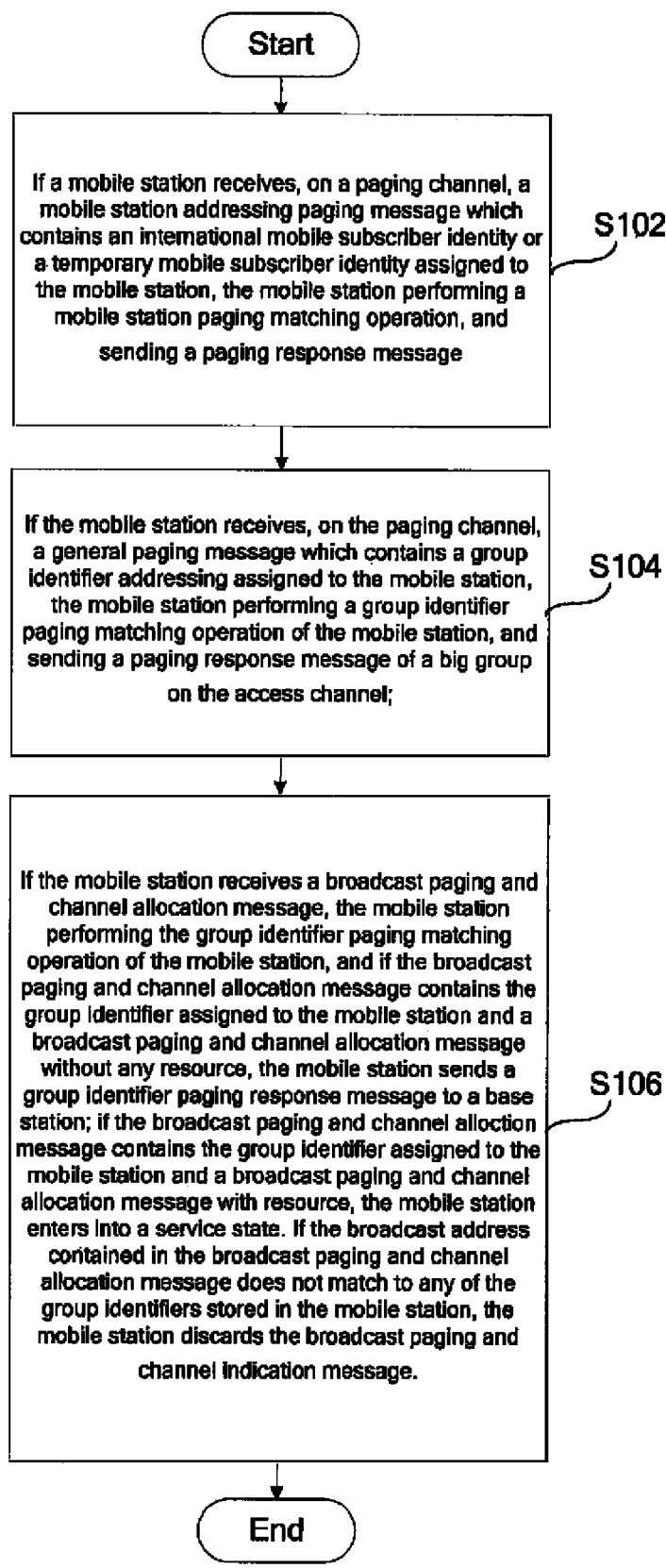
FIG. 1 is a flow diagram of the method for matching group paging of a CDMA trunking system according to the present invention.

The embodiment of the present invention provides a method for matching group paging of a CDMA trunking system. FIG. 1 is a flow diagram of the method for matching group paging of a CDMA trunking system according to the present invention, it needs to be noted that the steps shown in the flow diagram of the drawing can be executed in a computer system, such as a set of computer executable instructions; in addition, although the flow diagram shows a logic sequence, the steps shown or described can be executed in a sequence different form that shown herein in certain circumstances.

As shown in FIG. 1, the method for matching group paging of a CDMA trunking system provided by the embodiment of present invention comprises:

step S102, when a mobile station receives, on a paging channel, a mobile station addressing paging message which contains an international mobile subscriber identity (IMSI) or a temporary mobile subscriber identity (TMSI) assigned to the mobile station, the mobile station performs a mobile station paging matching operation, and sends a paging response message on an access channel;

preferably, in Step S102, if the mobile station receives, on a forward common control channel, the mobile station addressing paging message containing the international mobile subscriber identity or the temporary mobile subscriber identity assigned to the mobile station, the mobile station sends the paging response message on a reverse common signaling channel; if the mobile station is configured to receive a broadcast message and receives a general paging message which contains a burst type and a receiving broadcast address on the paging channel that the mobile station is configured to, the mobile station performs a broadcast paging process; if the mobile station is configured to receive the broadcast message and receives a general paging message which contains the burst type and the receiving broadcast address on the forward common control channel that the mobile station is configured to, the mobile station performs an enhanced broadcast paging process;

step S104, when the mobile station receives, on the paging channel, a general paging message which contains a group identifier addressing assigned to the mobile station, a group identifier paging matching operation of the mobile station is performed, and the mobile station sends a paging response message of a big group on the access channel;

step S106, when the mobile station receives a broadcast paging and channel allocation message, the group identifier paging matching operation of the mobile station is performed;

in Step S106, there are several kinds of situations as follow:

(1) if the broadcast paging and channel allocation message contains the group identifier assigned to the mobile station and is a broadcast paging and channel allocation message without any resource, the mobile station sends a group identifier paging response message to a base station;

in particular, if the base station receives the group identifier paging response message, the base station sends an extended channel allocation message or a PTT broadcast paging and channel allocation message;

wherein under the situation that the group identifier paging response message received by the base station is a paging response of a big group, the base station sends the extended channel allocation message, and the base station initiates a procedure of service channel process to the mobile station;

under the situation that the group identifier paging response message received by the base station is the response to the broadcast paging and channel allocation message without any resource, the base station sends the PTT broadcast paging and channel allocation message, and the base station sends a broadcast paging and channel allocation message with resource to the mobile station, and instructs the mobile station to establish a CDMA service channel;

(2) if the broadcast paging and channel allocation message contains the group identifier assigned to the mobile station and is a broadcast paging and channel allocation message with resource, the mobile station enters into a service state;

(3) if the broadcast address contained in the broadcast paging and channel allocation message does not match to any of the group identifiers stored in the mobile station, the mobile station discards the broadcast paging and channel allocation message.

Preferably, in above Step S102 to S106, it is also need to determine a time slot period of PTT broadcast group identifier paging. The method for determining the time slot period of PTT broadcast group identifier paging comprises: when the mobile station calls a terminal, the time slot period is used to monitor the paging channel; when the mobile station monitors the time slot of group identifier paging, the time slot period is used to receive the broadcast paging and channel allocation message. The time slot period is a paging channel time slot period having a time length equal to $(2^{i-4} \times 16+3)$ time slots, wherein $0 \leqq i \leqq 7$, i may be a parameter message received from a PTT system.

The preferred embodiments of the present invention will be described in detail hereinafter.

A preferred embodiment of the present invention provides a method for matching group paging of a CDMA trunking system, this method comprises:

A. Set and determine the encoding mode of a group identifier (GID).

Figure 2A:
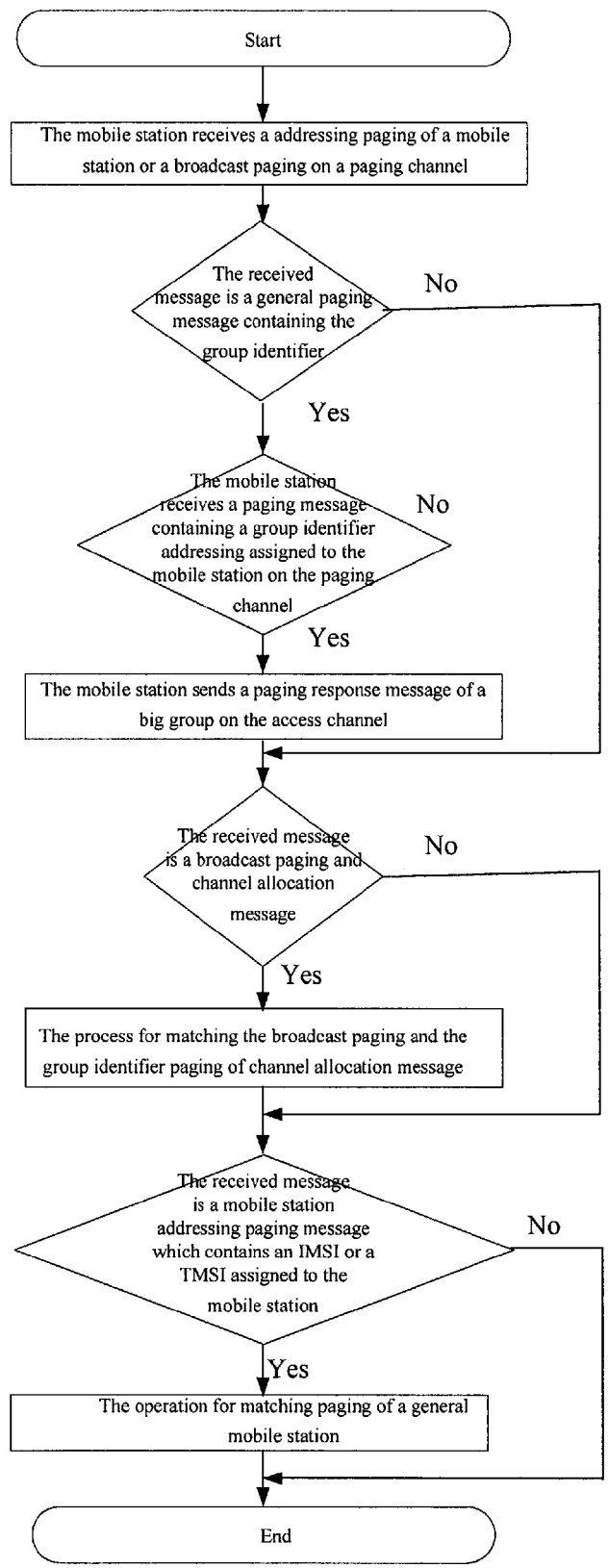
FIG. 2a is a flow diagram of a paging matching operation of a mobile station according to one embodiment of the present invention, wherein the mobile station receives a mobile station addressing paging or broadcast paging.
Figure 2B:
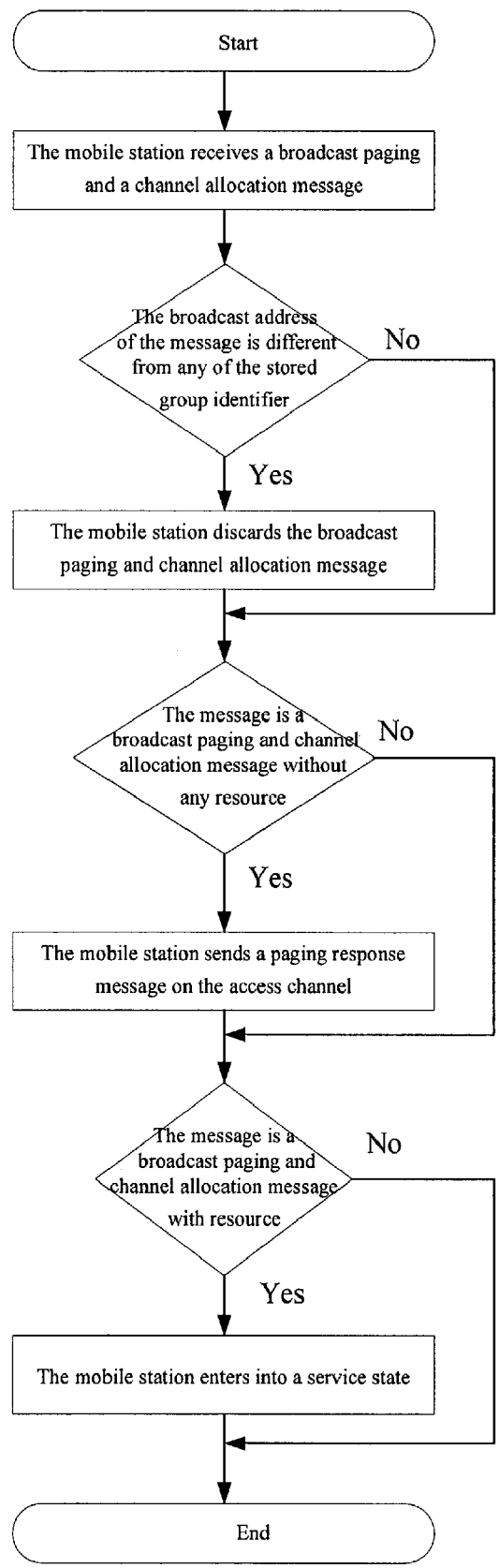
FIG. 2b is a flow diagram of a paging matching operation of a mobile station according to one embodiment of the present invention, wherein the mobile station receives a broadcast paging and channel allocation message.

B. Perform the GID matching operation of the mobile station during a paging process (as shown in FIG. 2a and FIG. 2b, FIG. 2a is a flow diagram of a paging matching operation of a mobile station according to one embodiment of the present invention, wherein the mobile station receives a mobile station addressing paging or a broadcast paging; FIG. 2b is a flow diagram of a paging matching operation of a mobile station according to one embodiment of the present invention, wherein the mobile station receives a broadcast paging and channel allocation message);

in particular, if the mobile station receives the addressing paging of a mobile station or the broadcast paging, a paging matching operation of the mobile station will be performed. If the mobile station receives, on the paging channel, a mobile station addressing paging message containing an IMSI or a TMSI assigned to the mobile station, the process enters into C; if the mobile station receives a general paging message containing the group GID, the process enters into D; and if the mobile station receives a broadcast paging and channel allocation message, the process enters into E.

C. Referring to FIG. 2a, the original IMSI matching scheme is performed, and the mobile station sends a paging response message on the access channel.

In particular, if the mobile station receives, on a forward common control channel, a mobile station addressing paging message containing the IMSI or the TMSI assigned to the mobile station, the mobile station sends a paging response message on a reverse common signaling channel (r-csch).

If the mobile station is configured to receive the broadcast message, and the mobile station receives a general paging message which contains a burst type and a receiving broadcast address on the paging channel that the mobile station is configured to, the mobile station performs a broadcast paging process.

If the mobile station is configured to receive a broadcast message, and the mobile station receives a general paging message which contains the burst type and the receiving broadcast address on the forward common control channel that the mobile station is configured to, the mobile station performs the enhanced broadcast paging process. Then the process enters into I;

D. Referring to FIG. 2a, perform the GID paging matching operation of the mobile station. If the mobile receives, on the paging channel, a paging message containing the GID addressing assigned to the mobile station, the mobile station sends a paging response message of a big group on the access channel. Then the process enters into I.

E. Referring to FIG. 2b, perform the GID paging matching operation of the mobile station. If the broadcast address does not match to any of stored group identifiers, the process enters into F; if the mobile station receives, on the paging channel, a broadcast paging and channel allocation message containing the GID addressing assigned to the mobile station, and the message is a broadcast paging and channel allocation message without any resource, the process enters into G; if the message is a broadcast paging and channel allocation message with resource, the process enters into H.

F. The mobile station discards the broadcast paging and channel allocation message, and then the process enters into I.

G. The mobile station sends a paging response message on the access channel, and then the process enters into I.

H. The mobile station directly enters into a service state, and then the process enters into I.

I. End the matching process.

The encoding mode for setting and determining the group identifier (GID) in Step A related to the present method will be described in detail hereinafter:

Determine the encoding mode of the group identifier (GID). In a trunking service, each mobile station may belong to different groups, and each group has a different identifier code GID to identify the group. Each group can be identified by the group identifier code GID. The group identifier code GID is made up of 16 numbers (0-9). The structure of the GID is shown in the Table 1:

TABLE 1

| T | MCC | MNC | XX (MIN) | H0H1H2 | ABCDE |
|---|-----|-----|----------|--------|-------|

Wherein T represents the type (TYPE), denoting the type of the GID and made up of one number. The GID has two types, one of which is fixed, in this case the GID only has 27 bits after encoding and has 28 bits totally by adding the TYPE flag bit; the other type is dynamic, in this case the GID has 51 bits after encoding and has 52 bits totally by adding the TYPE flag bit; a mobile country code (MCC) consists of 3 numbers and occupies 3 digits, China uses 86; mobile network numbers (MNCs) consists of 2 numbers and occupies 2 digits;

XX is a mobile identification number (MIN) segment assigned to each country and consists of 2 numbers, occupies 2 digits;

a PTT home register (PHR) identity code H0H1H2 is uniformly assigned to the local networks by the operators and consists of 3 numbers;

user number ABCDE is a unique ID assigned by the PHR and is assigned by each PHR of its own wish, ranges from 00000 to 99999, and consists of 5 numbers.

A 3-digit MCC is encoded into a 10-bit binary number, and the mobile station will store the 10-bit MCC. A 2-digit MNC and a 2-digit MIN are respectively encoded into two 7-bit binary numbers, and the mobile station will store the 7-bit MNC and 7-bit MIN. An 8-digit GID_S consisted of 8 numbers is encoded into a 27-bit binary number, and the mobile station will store the 27-bit GID_S.

In particular, the binary encoding of the GID_S can be defined as follows:

1. The first 3 numbers of the GID_S can be encoded into the highest 10 valid bits by the following encoding algorithm;
   a. D1, D2, D3 are used to represent 3 numbers, and the value of 0 is 10;
   b. Calculates 100×D1+10×D2+D3−111;
   c. Table 2 is a table showing the conversion from the decimal system to the binary system, as shown in Table 2, the results obtained in step b are converted into 10-bit binary numbers according to the corresponding relationship of the decimal system and the binary system.

TABLE 2

| Decimal number | Binary number |
|----------------|---------------|
| 0 | 0000000000 |
| 1 | 0000000001 |
| 2 | 0000000010 |
| 3 | 0000000011 |
| 4 | 0000000100 |
| ... | ... |
| 998 | 1111100110 |
| 999 | 1111100111 |

2. Next, 2 numbers are respectively encoded into 7 valid bits of the GID_S as the middle 7 bits of the 27-bit binary number;

the detailed encoding mode is described as follows:
   a. D11 is used to represent the eleventh digit, D12 represents the twelfth digit, and if value is 0, it is replaced with 10;
   b. Calculate 10×D12+D11−11;
   c. The result obtained in step b is converted into a 10-bit binary number by the conversion from the decimal system into the binary system shown in Table 2, and the lowest 7 bits is extracted as the final result.

3. The last 3 digits are encoded into 10 valid bits of the GID_S, using the same encoding mode in above step 1, and being used as the last 10 bits of the 27-bit binary number.

Table 3 shows the air interface encoding mode of the GID, in particular shows an encoding scheme of a 52-bit GID:

TABLE 3

| Field name | Length (bit) |
|------------|--------------|
| GID_TYPE | 1 |
| MCC | 10 |
| GID_11_12 (MNC) | 7 |
| GID_9_10 (MIN) | 7 |
| GID_S | 27 |

Table 4 shows the air interface encoding mode of the GID, in particular shows an encoding scheme of a 28-bit GID:

TABLE 4

| Field name | Length (bit) |
|------------|--------------|
| GID_TYPE | 1 |
| GID_S | 27 |

The method provided by the embodiments of the present invention also relates to the following aspects: 1. Determine a time slot period of PTT broadcast GID paging; 2. Respond to the GID paging response message by the base station side. These two aspects will be described in detail hereinafter.

1. Determine a Time Slot Period of PTT Broadcast GID Paging

The GID paging period is suitable to monitor the paging channel, and supports the mobile station receiving the broadcast paging and channel allocation message, the GID paging time slot is used as the PTT broadcast channel allocation message. All the mobile stations supporting broadcast group paging terminals may monitor the GID to paging these time slots and be used to receive the broadcast paging and channel allocation message.

On the paging channel, one GID broadcast paging period is a paging channel time slot period with a time length of (B+3) time slots.

$$B = 2^{i-4} \times 16 = 2^i, \ 0 \leq i \leq 7$$

Wherein i=PTT_BCAST_INDEX$_s$ is the parameter message received from the PTT system or is set as a default value when the extended parameter message is not yet sent. Since the minimal value of B is 1, the time slot period of PTT broadcast paging has a minimal value of 320 ms.

Table 5 shows the corresponding relationship between PTT_BCAST_INDEX and the length of the time slot period.

The first time slot of each GID broadcast paging period is the time slot of the next paging channel:

$$\lfloor t/4 \rfloor \bmod (B+3) = 0,$$

wherein t represents a system time in the unit of frame, and ⌊ ⌋ represents the operation of floor.

TABLE 5

| PTT_BCAST_INDEX | The length of the time slot period |
|-----------------|-----------------------------------|
| 0 | 0.32 s (4 time slots) |
| 1 | 0.40 s (5 time slots) |
| 2 | 0.56 s (7 time slots) |
| 3 | 0.88 S (11 time slots) |
| 4 | N/A |
| 5 | 2.80 s (35 time slots) |

TABLE 5-continued

| PTT_BCAST_INDEX | The length of the time slot period |
|---|---|
| 6 | 5.36 s (67 time slots) |
| 7 | 10.48 s (131 time slots) |

2. Respond to the GID Paging Response Message by the Base Station Side

Figure 3:
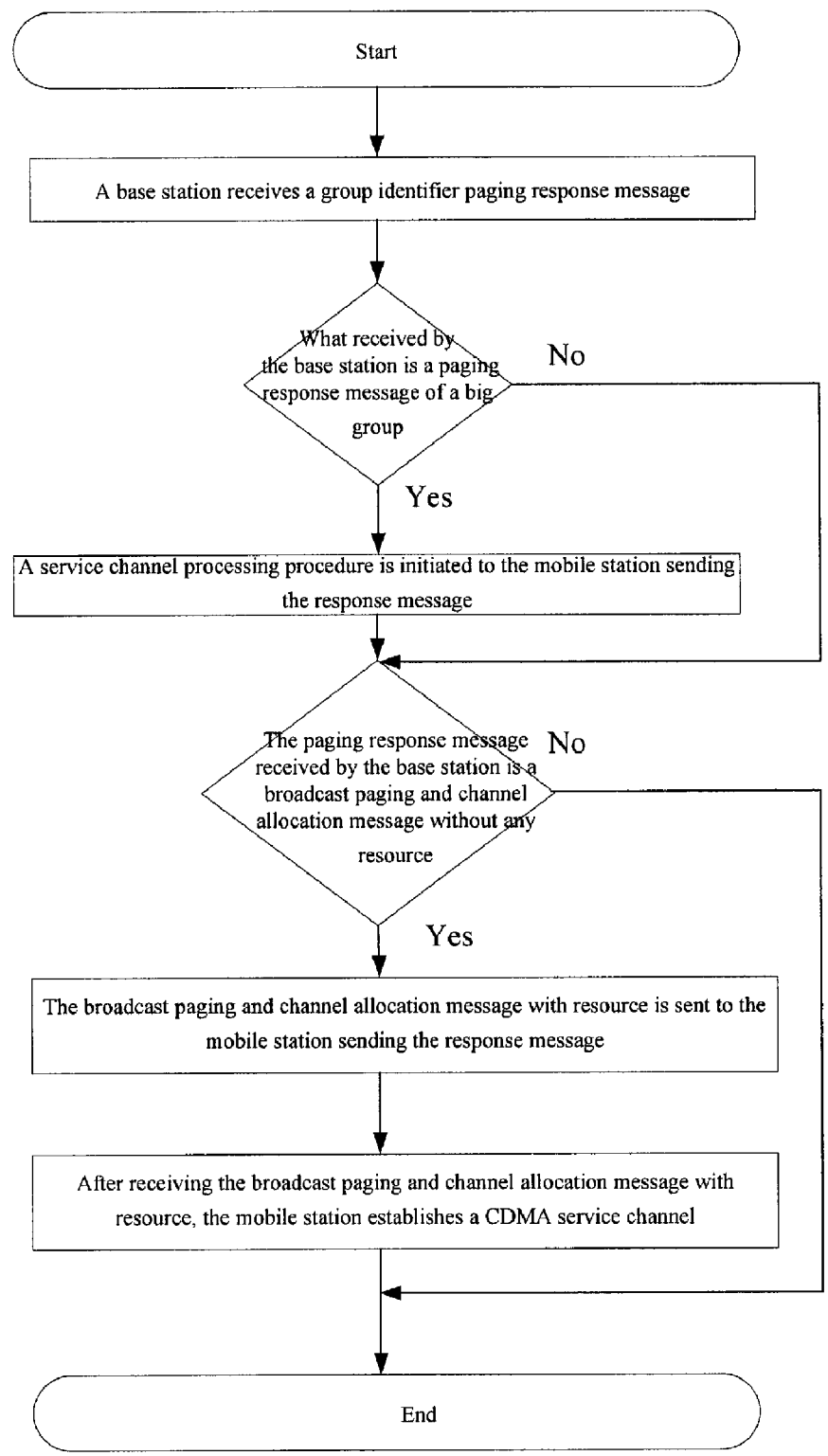
FIG. 3 is a flow diagram of a base station responding to a GID paging response message according to another embodiment of the present invention.

FIG. 3 is a flow diagram that a base station responds to a GID paging response message according to another embodiment of the present invention. As shown in FIG. 3, if a base station receives a GID paging response message, the base station should send an extended channel allocation message or a PTT broadcast paging and channel allocation message; the processing procedure herein is similar to that of situation (1) in above Step S106, thus the description thereof is omitted.

In the particular implementation process, for example, in the networking environment of Operator A, the encoding mode of a certain group is as follows: uses the fixed encoding mode, for example, T field is 1, assume that the MCC of the country is 460, the MNC is 03, the XX is 01, the H0H1H2 is uniformly assigned to the local network by the operator and assumed to be 122, ABCDE is the unique ID assigned by the PHR and assumed to be 12345, then the GID code is 1460030112212345.

Since the encoding mode is the fixed, the 28-bit GID encoding scheme is used, wherein the TYPE occupies 1 bit, the GID_S occupies 27 bits, as shown in Table 6 in detail. Table 6 shows a situation of performing encoding according to the 28-bit GID encoding scheme.

TABLE 6

| Field name | Length (bit) |
|---|---|
| GID_TYPE | 1 |
| GID_S | 27 |

After the encoding is completed, during the paging process, if Terminal B is a member of the group, Terminal B stores the GID in the storage area of the terminal. During the standby process after the Terminal B being powered on, if an addressing paging of a mobile station or a broadcast paging is received, Terminal B performs the mobile station paging matching operation. If Terminal B receives a general paging message containing the group GID, Terminal B performs the GID paging matching operation of the mobile station. If Terminal B receives, on the paging channel, a paging message containing the GID addressing assigned to the mobile station, Terminal B sends a paging response message of a big group on the access channel. The matching process ends.

To sum up, through the technical scheme of the present invention, the mobile station performs the corresponding group paging matching operation according to the received different messages, which can solve the problem that the encoding mode of the GID in the related art results in that a group paging operation can not be performed effectively, thus the group paging process can be performed with high efficiency.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for matching group paging of a CDMA trunking system, comprising:
   if a mobile station receives, on a paging channel, a mobile station addressing paging message which contains an international mobile subscriber identity or a temporary mobile subscriber identity assigned to the mobile station, the mobile station performs a mobile station paging matching operation, and sends a paging response message on an access channel;
   if the mobile station receives, on the paging channel, a general paging message which contains a group identifier addressing assigned to the mobile station, the mobile station performs a group identifier paging matching operation of the mobile station, and sends a paging response message of a large group on the access channel; and
   if the mobile station receives a broadcast paging and channel allocation message, the mobile station performs the group identifier paging matching operation of the mobile station, wherein if the broadcast paging and channel allocation message contains the group identifier assigned to the mobile station and is a broadcast paging and channel allocation message without any resource, the mobile station sends a group identifier paging response message to a base station; if the broadcast paging and channel allocation message contains the group identifier assigned to the mobile station and is a broadcast paging and channel allocation message with resource, the mobile station enters into a service state; if the broadcast address contained in the broadcast paging and channel allocation message does not match to any of the group identifiers stored in the mobile station, the mobile station discards the broadcast paging and channel allocation message.

2. The method for matching group paging according to claim 1, wherein when the mobile station receives the mobile station addressing paging message which contains the international mobile subscriber identity or the temporary mobile subscriber identity assigned to the mobile station,
   if the mobile station receives, on a forward common control channel, the mobile station addressing paging message containing the international mobile subscriber identity or the temporary mobile subscriber identity assigned to the mobile station, the mobile station sends the paging response message on a reverse common signaling channel;
   if the mobile station is configured to receive a broadcast message and receives a general paging message which contains a burst type and a receiving broadcast address on the paging channel that the mobile station is configured to, the mobile station performs a broadcast paging process;
   if the mobile station is configured to receive the broadcast message and receives a general paging message which contains the burst type and the receiving broadcast address on the forward common control channel that the mobile station is configured to, the mobile station performs an enhanced broadcast paging process.

3. The method for matching group paging according to claim 1, further comprising:
   if the base station receives a group identifier paging response message, the base station sends an extended channel allocation message or a push to talk (PTT) broadcast paging and channel allocation message.

4. The method for matching group paging according to claim 3, wherein if the base station sends the extended channel allocation message, the group identifier paging response message received by the base station is a paging response of a large group, and the base station initiates a procedure of service channel process to the mobile station.

5. The method for matching group paging according to claim 3, wherein if the base station sends the PTT broadcast paging and channel allocation message to the mobile station, the group identifier paging response message received by the base station is the response to the broadcast paging and channel allocation message without any resource, the base station sends a broadcast paging and channel allocation message with resource to the mobile station, and instructs the mobile station to establish a CDMA service channel.

6. The method for matching group paging according to claim 1, further comprising: determining a time slot period of a PTT broadcast group identifier paging, wherein when the mobile station calls a terminal, the time slot period is configured to monitor the paging channel; and when the mobile station monitors the time slot of group identifier paging, the time slot period is configured to receive the broadcast paging and channel allocation message.

7. The method for matching group paging according to claim 6, wherein the time slot period is a paging channel time slot period having a time length equal to $(2^{i-4} \times 16+3)$ time slots, wherein $0 \leq i \leq 7$, wherein i is the parameter message received from a PTT system.

* * * * *